Dec. 26, 1961 W. G. OWNBY 3,015,063
MAGNETIC CALIPER
Filed June 23, 1960 4 Sheets-Sheet 1
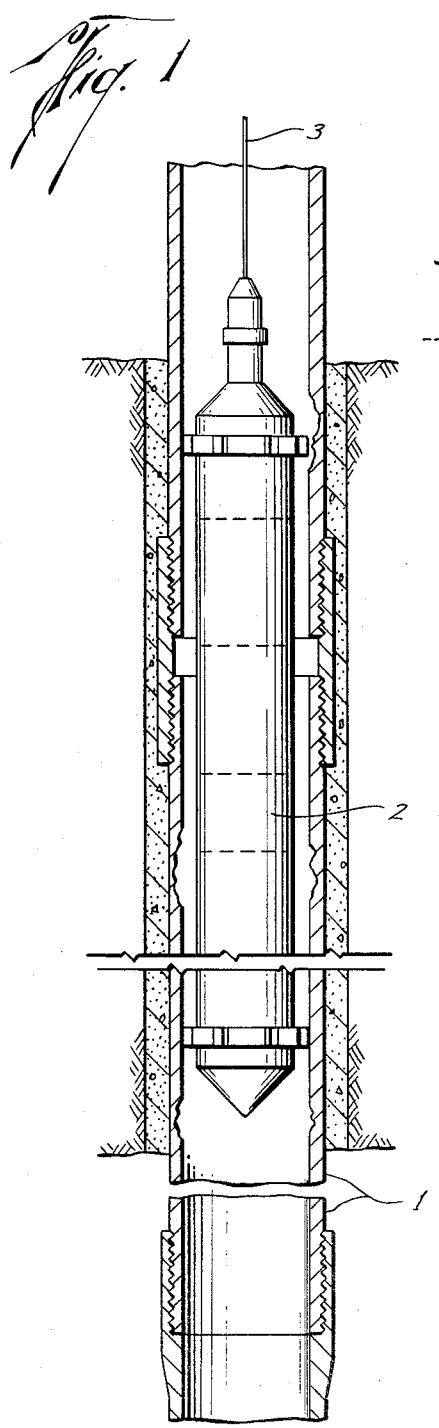
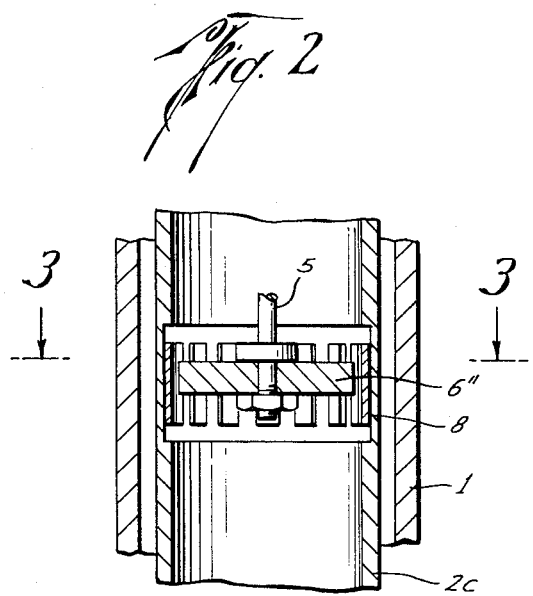
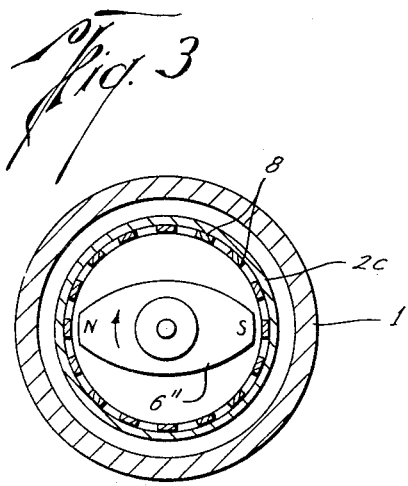
W. G. Ownby
INVENTOR.
BY *J. C. Helmeg*
ATTORNEY

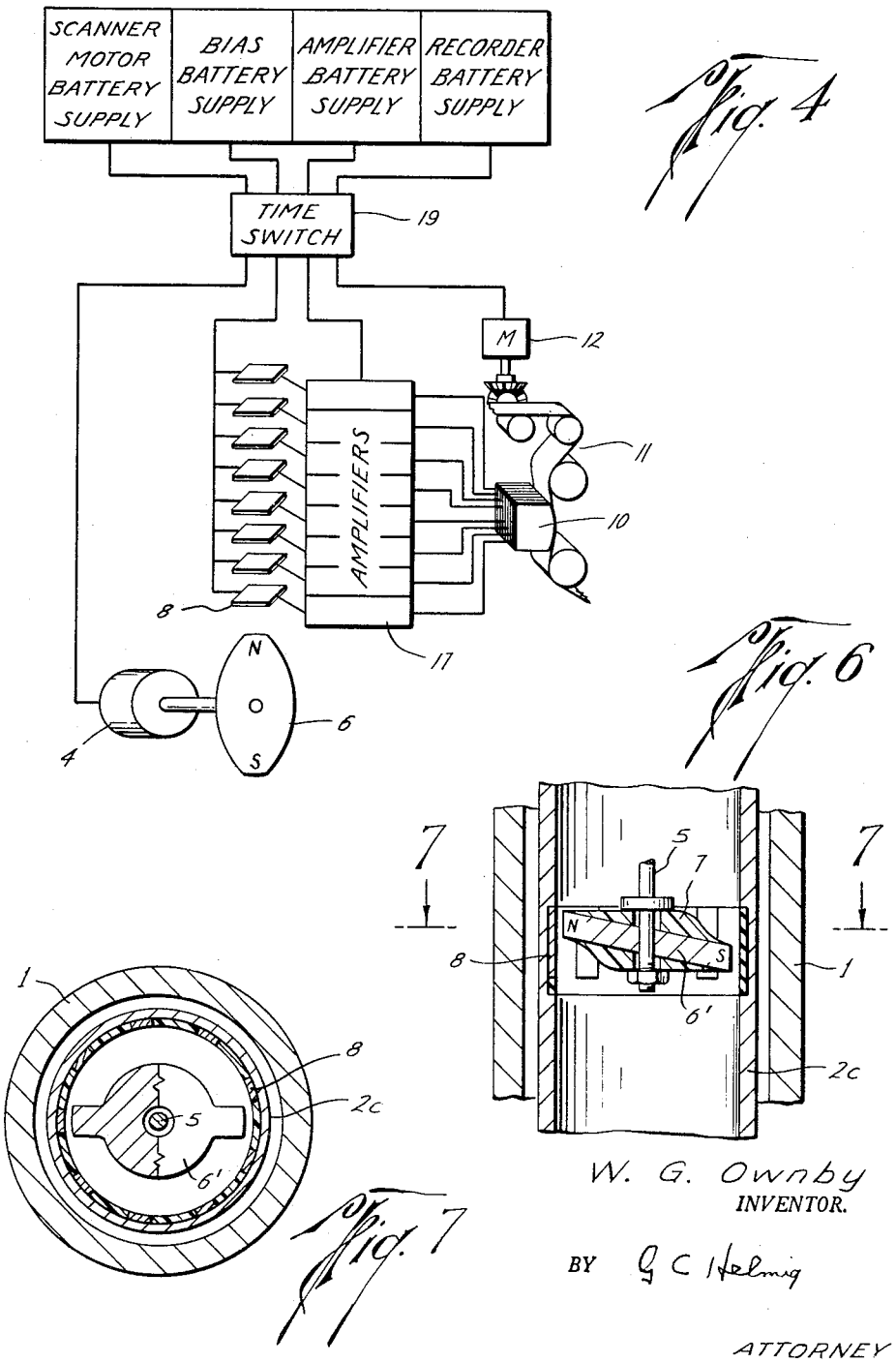

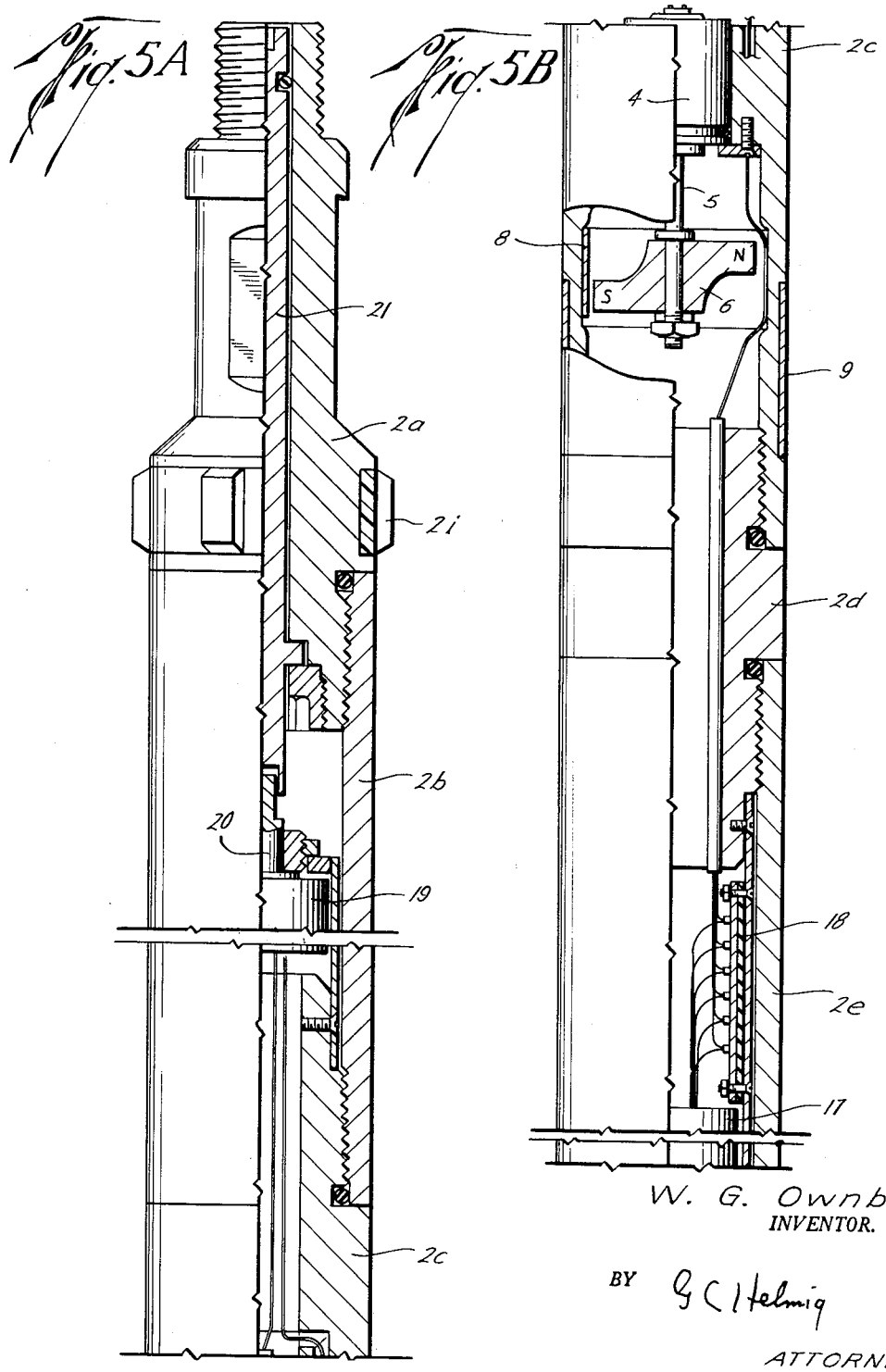

Dec. 26, 1961 W. G. OWNBY 3,015,063
MAGNETIC CALIPER
Filed June 23, 1960 4 Sheets-Sheet 4
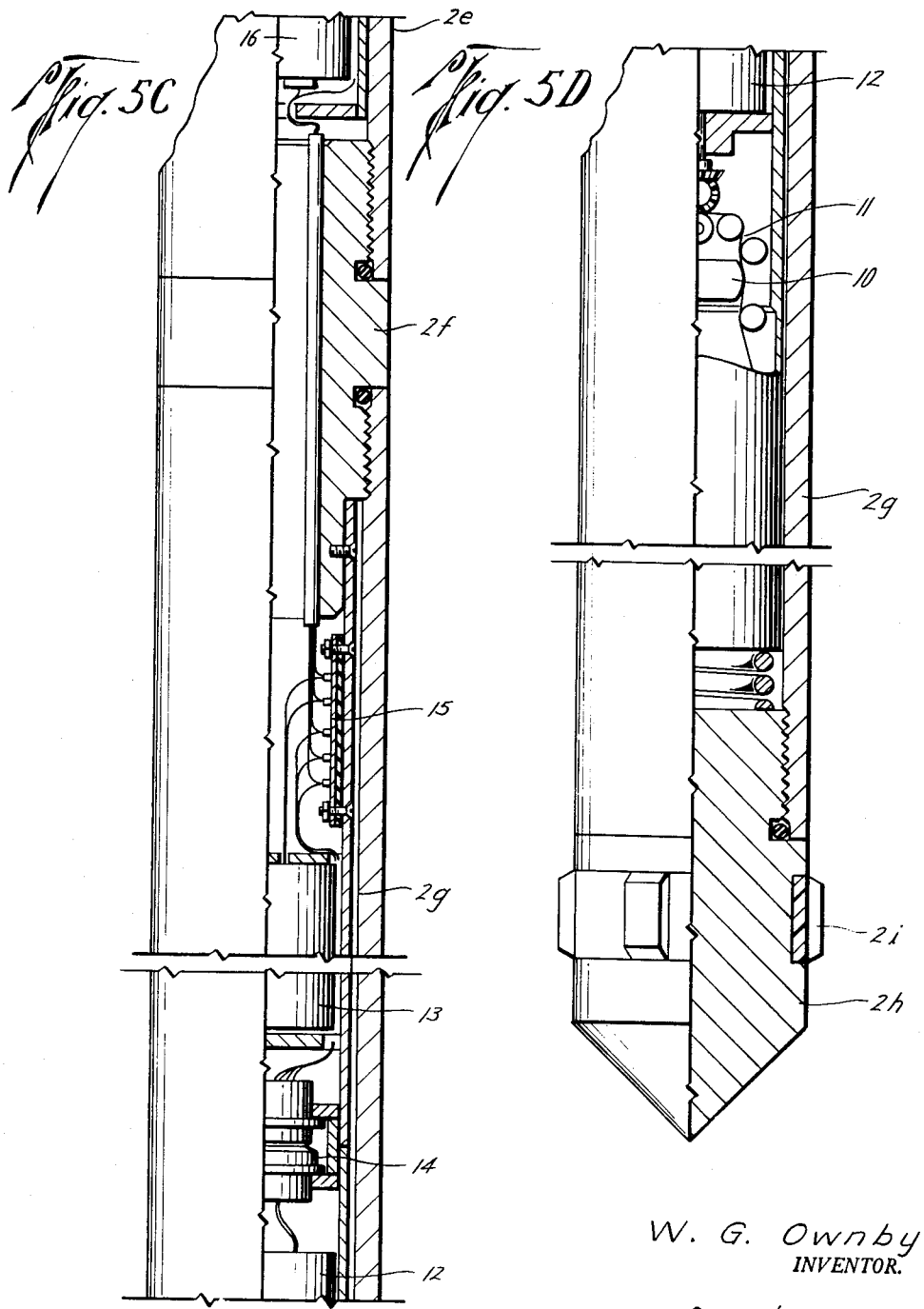
W. G. Ownby
INVENTOR.
BY G C Helmig
ATTORNEY – # United States Patent Office 3,015,063
Patented Dec. 26, 1961

3,015,063
MAGNETIC CALIPER
Warren G. Ownby, Houston, Tex., assignor to Camco, Incorporated, Houston, Tex., a corporation of Texas
Filed June 23, 1960, Ser. No. 38,246
9 Claims. (Cl. 324—37)

This invention relates to dimensional measuring devices and more particularly to an improved electrical caliper for taking surface measurements on a body of magnetic material.

In its broad concept the invention is concerned with gap space between the surface to be measured and a magnetic pole whose field extends across the gap and with sensing of reluctance to magnetic force in the gap as shown by the output voltage developed in a Hall-effect element positioned within the gap field. Such output voltage will be proportional to and therefore indicative of gap size and can be utilized upon surface traverse of the magnet pole during controlled relative movement between the magnetic body and the measuring device to determine surface irregularities and the extent thereof.

In an embodiment to be later described, gap measurement is employed for determining diametrical dimensions of cylindrical or tubular goods and by continuous relative movement between the testing instrument and the circular wall being measured, there will be obtained a running record of the location and depth of surface discontinuities such as pits and worn spots.

With the foregoing in mind, it is an object of the invention to provide instrumentation wherein magnet poles of opposite polarity and in field gap relation with the surface of a magnetic body sweep over the surface both circularly and axially upon relative movement therebetween and a circular succession of Hall-effect elements positioned within the gap sequentially sense the magnetic field with a development of output voltage proportional to gap reluctance whereby a record of successive pulses reflects surface conditions throughout the circular and axial areas of a magnetic body under inspection.

An important use for calipers is in testing tubing or casing while in place within an oil or gas well and to detect the existence and extent of surface depressions inclusive of cracks, acid corrosion and erosion on the inner face of the pipe wall. Wall surface defects, unless periodically checked and corrected, can cause serious failures without warning. Heretofore calipers generally have been of the feeler type wherein one or more small area bearing surfaces ride with an outward pressure on the wall and indicate surface variations by feeler displacement. Circumferentially extending pits or ring corrosion of varying depth are not always accurately identified by a feeler and paraffin or other caked accumulations on the wall, and which may overlie a serious fault, give false readings. Furthermore, the scratching and gouging of friction drag feelers can crack, chip and remove the protective film sometimes applied as a pipe coating and expose the pipe wall to corrosive fluids, and even with uncoated pipe can initiate surface defects.

As distinguished from calipering by wall contact, the present gap reluctancae measurement avoids injury to the surface and enables a record of true inside diameter and cross sectional changes in wall tubing diameters, ignoring completely nonmagnetic protective coatings and deposits of wax, asphalt, calcium and the like. The measure of magnetic reluctance of the path of magnetic flux delivered radially outwardly to the ferromagnetic tube wall is indicative of the distance the flux traveled through a medium other than a magnetic material and therefore represents the radial distance to the pipe wall surface at the point of flux delivery.

More specifically, the present invention contemplates the provision of a plurality of magnetically responsive electrical sensing elements in circumferential array on the inside of a nonmagnetic housing which is to be passaged through a pipe in the calipering operation. Associated with and located inside and coaxially of the surrounding zone or band containing the circularly spaced apart sensing elements, is a diametrically oriented permanent bar magnet centrally mounted on the spinner shaft of an electric motor. The oppositely projecting arms of the bar magnetic are of equal length and their north and south pole ends during spinning rotation sweep closely by each sensing element successively. Magnetic flux between the opposite poles extends through the nonmagnetic housing and across the intervening air space to the surrounding magnetic pipe wall under investigation and also passes through any sensing elements traversed by the field and which elements themselves are of nonmagnetic material and accommodate flux passages without hindrance or disturbance. As either magnetic pole comes into radial alignment with any sensing element, the flux through the element and across the gap between the pole and the pipe wall surface is a function of gap reluctance. The sensing element, in response to flux density through it, produces an output voltage pulse having an amplitude proportional to gap lengths and hence is indicative of the radial distance to the tube surface opposite the sensing element.

The permanent magnet, the two radial gaps between the ends of the magnet and the pipe's wall and the pipe itself constitute a diametrical magnetic circuit. Due to rotation of the magnet and its longitudinal movement through the pipe, an infinite number of these diametrical magnetic circuits are generated sequentially. A finite number of these magnetic circuits are of interest and are measured in practicing the present invention. The number of these circuits measured determines the resolution of the caliper and the number of sensing elements employed and their oriented arrangement determines the number of circuits.

In a magnetic circuit:

$$F = \phi R$$

where:

$F$ = magnetomotive force
$\phi$ = magnetic flux
$R$ = reluctance

The reluctance of a material is its property which opposes the passage of flux lines through it. Reluctance varies directly with length and inversely with both the cross sectional area and the permeability of the material.

$$R = \frac{L}{MA}$$

where:

$L$ = length
$A$ = cross sectional area
$M$ = permeability

The term permeability ($M$) is used to measure the ability of a given substance to conduct magnetic flux in comparison with empty space, the permeability of which is taken as unity. Air, glass, wood, oil, wax, water, etc. and certain nonferrous metals including copper and aluminum have values of $M$ approximately the same as that of empty space. The magnetic materials (ferromagnetic) principally soft iron and steel are very much better conductors of flux. These may be from several hundred to several thousand times as good as nonmagnetic materials.

There is to be measured the reluctance of radial paths between a centrally located tool and the wall of a surrounding pipe. In order to have readings a function of radial distance, the cross-sectional area of each measured path is held constant. This is accomplished by the measuring elements which have a fixed area through which flux may pass and be measured. The magnetomotive force (F) is essentially constant because the permanent magnet works with a practically constant gap. The permeability of the measured gap, although composed of varying proportions of nonmagnetic materials, is practically the same as a vacuum, i.e., unity. The relation above may therefore be written as follows:

$$F = \phi R = \phi \frac{L}{MA}$$

and $$\phi = \frac{FMA}{L}$$

but:

F is a constant
M is a constant, and
A is a constant

Therefore:

$$\phi = \frac{\text{Constant}}{\text{Length}}$$

and since $\phi$ is measured by this tool, the resultant output signal is a value that is inversely proportional to the gap length.

For a more complete disclosure of the invention, reference will be made to the accompanying drawings wherein FIG. 1 shows a portion of a well in cross section with an inspection tool suspended therein; FIG. 2 is a vertical sectional view of a fragment of the tool illustrating one form of rotating magnet and an assembly of sensing elements; FIG. 3 is a transverse section taken on line 3—3 of FIG. 2; FIG. 4 is a diagram representative of the electric circuitry; FIGS. 5A, 5B, 5C and 5D are companion views showing a self contained testing unit partly in elevation and partly in vertical section as constructed for use in small diameter well tubing; FIG. 6 is a vertical sectional view of a fragment of a tool and an alternative magnet arrangement; and FIG. 7 is a transverse section as on line 7—7 of FIG. 6.

In FIG. 1 of the drawing, the inner surface of the well tubing 1 is shown as having pitted regions whose location and depths are to be recorded on upward travel of a self contained inspection tool 2 which previously had been lowered through the tubing from the surface by means of a piano wire 3 or other suitable means of suspension. To house all of the necessary operating components and avoid the bother of having electrical conductor cables extending from the sensng mechanism within the tool to a recorder located at the surface, the complete assembly will involve a casing of considerable length in relation to its width. Thus, for use in a tubing having an internal diameter of two inches, there has been provided a tool which is approximately six feet long and about one and three-fourths inches in outside diameter. For convenience of manufacture and assembly, the tool housing comprises an end to end succession of threaded together tubular parts including an upper head 2a to be coupled at its upper end to a suspension wire socket; a timer control switch and battery enclosing tube 2b; a nonmagnetic coupling and scanner housing tube 2c; a coupling nipple 2d; a housing tube 2e for electrical components; a coupling nipple 2f; a lower housing tube 2g for additional electric components and for recording mechanisms; and a bottom nose plug 2h. Both the head 2a and the bottom plug 2h are provided with peripheral grooves in which are molded or otherwise fitted centralizer rings of nylon or other suitable plastic material, each having a series of outwardly projecting bosses 2i for slip bearing on the tube for maintaining the tool in approximately centered relation in the tubing.

Secured within the nonmagnetic housing 2c in coaxial relation thereto is a small electric motor 4 having a depending power shaft 5 to which is secured a central hub of a bar magnet 6 to be rotated inside the nonmagnetic housing 2c during a measuring operation. The oppositely extending arms of the permanent bar magnet 6 are of equal length and their ends provide poles of opposite polarity. In the case of the magnet as seen in FIG. 5B, its arms project radially outwardly from the hub in axially offset relation one to another. The same type of offset pole relation is obtained with a straight bar magnet fitted to the motor to extend at an acute angle to the axis, as illustrated at 6' in FIG. 6. In this instance, the magnet 6' is fixed to the motor shaft 5 by being clamped between a pair of tapered washers 7. Alternately, the bar magnet, as shown at 6" in FIG. 2, is clamped to extend in a plane perpendicular to the axis of the motor shaft 5. In each instance the flux path between opposite poles of the rotary permanent magnet while the tool is in use will extend through the wall of the magnetic well tube 1 under inspection and across the gaps between the inside face of the tube 1 and the opposite ends of the magnet.

In the space between the well tube 1 and the circular path of the magnet poles there is mounted on the inside face of the nonmagnetic housing 2c a series of circularly spaced apart sensing elements 8. As illustrated, each is a Hall-effect type element and consists essentially of a crystalline semiconductor compound of high mobility. Examples of such commercially available compounds are indium antimonide and indium arsenide and they are formed as thin wafers of greater length than width so that several may be arranged circumferentially about the caliper housing. As seen in FIG. 7, the sensing elements 8 are equally circularly spaced apart and an odd number is employed so that when either magnet pole is aligned with any sensing element its opposite pole will be aligned with a diametrically opposite space between a pair of adjoining sensing elements. The spacing between the elements and the width of each element approximate the circular extent of the magnet poles. This same relationship will apply to the offset poles of the magnet shown in FIG. 5B. On the other hand, with the magnet as shown in FIG. 2, an equal number of sensing elements equally spaced apart is employed, as shown in FIG. 3, whereby the magnetic lines of force passing between the poles will pass through diametrically oppositely disposed sensing elements at any instant.

In the case of the alternate arrangement of FIG. 5B, the exterior of the nonmagnetic housing 2c has fitted to it an annular ferromagnetic sleeve 9 which surrounds approximately half of the axial length of the bank of sensing elements. The length of the sleeve 9 is not critical but should be approximately half the tool's diameter. This magnetic sleeve provides a reluctance reducing and reference diameter band, as will later be referred to.

Each of the Hall-effect elements is formed with two pairs of connector wires, one of which is for the passage of electric current through the element and the other pair of which is to deliver output voltage to a recording mechanism. The recording mechanism comprises a multiple trace magnetic recording head 10 in the form of a stack of interleaved recorders, one for each sensing element, and over which travels at a constant rate a suitable recording tape 11. The detail of the recorder unit is incidental to the present subject matter and will involve winding and unwinding reels for the tape, whose portion between the reels will pass over the recorder head 10 and will be controlled by a co-operating pair of feed rolls suitably driven by a small electric motor, indicated at 12. Current for operating the motor 12 will be supplied from suitable batteries 13 housed within the outer body section 2g above the motor 12 and where there is also housed a suitable plug and socket connector 14 and a junction plate 15.

Between the coupling nipples 2d and 2f, the housing 2e is of a sufficient length to house various components, including sets of batteries 16, amplifying units 17, a junction plate 18 and various other electrical components for inclusion in control circuits between the sensing elements 8 and the recording heads 10. The upper housing tube 2b similarly encloses electrical components including batteries to supply the magnet drive motor 4 plus a time delay switch 19 for controlling the start of the recording operation. This time delay switch will be of a known type having a manually prewound spring to power mechanical escapement mechanism so that a selected lapse of time will occur prior to closing multiple switch contacts and initiating operation of the electrical system. The lapse of time will be sufficient to enable the unit to be lowered to the desired depth before the start of the return or upward travel toward the surface at a given constant rate. Manual setting is through a stem 20 extending upwardly from the switch unit 19 and having drive socket connection with the lower end of a shaft 21 having rotatable bearing in and extending through the head 2a to a screw driver terminal slot near the upper end of the head 2a.

The circuit connections between the various components extend throughout the housing unit and provide circuitry as diagrammed in FIG. 4.

In the arrangement of FIG. 2 wherein an even number of sensing elements are employed and are arranged in diametrically opposite pairs, the rotation of the magnet will bring the opposite poles into various diameter alignments simultaneously with opposite pairs of sensing elements. At each such alignment relationship, magnetic flux will extend through and beyond each sensing element and directly to the wall of the surrounding pipe. Accordingly, the number of magnetic circuits is equal to one-half the number of sensing elements employed and each circuit utilizes an opposite pair of sensing elements, one in each of the two gaps between the pipe and the opposite magnetic poles. Each element measures reluctance of its respective gap and the sum resultant of their electrical output amplitudes is interpretatable to the total length of both gaps. Since the length of the magnet is known, the data is representative of the diameter of the pipe. With a plurality of pairs of sensing elements providing multiple trace reportings, there will be shown a multiplicity of pipe diameters throughout the length of the pipe and measured at successive levels as the caliper moves upwardly through the pipe. The record made provides a good sampling of the pipe's interior surface.

With the vertically stepped magnet poles, as in FIG. 6, in co-operation with sensing elements arranged so that no two are diametrically opposite each other, as in FIG. 7, both poles of the rotating magnet will sweep closely by each sensing element sequentially. Magnetic flux will extend across the field gap and directly to the wall of the surrounding pipe and as the tool travels upwardly, the most elevated end of the magnet, as, for example, the north pole, sweeps the inside face of the pipe in a narrow helix with flux of positive polarity, while at the same time the lower end or south pole of the magnet sweeps a similar helix immediately below the upper helix and with a flux of negative polarity. Speed of rotation of the magnet will be controlled, whereby angular velocity of the magnet ends is such that for each half revolution the extent of upward movement approximates vertical displacement between the magnet opposite ends. As a result, each radial gap measurement made by a positive sweeping flux passing through a given sensing element is followed by a similar measurement made by a negative sweeping flux through the same sensing element. Each given sensing element measures flux delivered to identical pipe areas a second time, first with positive flux and then with negative flux, with two electrical output voltage pulses emanating from each sensing element sequentially, one positive and one negative. The mean or average amplitude of these two voltages is representative of the radial distance from the ends of the rotating magnet to the pipe wall at each area thereof and these resulting measurements are without influence from magnetic anomalies or magnetic potentials that might prevail because of residual magnetism in the pipe.

In the magnet arrangement as shown in FIG. 5B, the poles are stepped and are for use with a bank of sensing elements arranged so that no two are diametrically opposite. Magnetic flux from the higher of the two poles, and which may be considered the positive pole, will extend beyond the housing across the gap space and directly to the surrounding pipe, sweeping the inside wall surface of the pipe in a narrow helix with a positive polarity flux. In this case the thin cylindrical sleeve 9 of ferromagnetic material outwardly beyond the path of the south pole and ending in a transverse region between the vertically offset north and south poles, reduces the effective reluctance of the flux path between the pipe wall and the lower pole. This is accomplished by intervention wherein the flux path, instead of being merely across the gap, is altered to become in effect two very low reluctance paths in series. One is between the lower magnet pole and the sleeve 9 and the other is between the sleeve 9 and the pipe. The former is of low reluctance because of its relatively short length and the latter is of low reluctance because of the large surface area presented for the distribution of flux. The combined reluctance, although in series, is effectively low. Accordingly, a radial gap measurement will be made by each sensing element as the sweeping flux at the upper pole passes through the sensing element and each measurement made at circularly spaced apart regions will be represented by a positive voltage pulse from each element during each revolution of the magnet. With vertical tool movement, the sequence of pulses from a given element will represent a succession of radial measurements along a single longitudinal line. The resulting record from each element can be interpretative as radial measurements sampling a plurality of vertical strips along the pipe's inside wall.

The sleeve 9 additionally provides a continuous standard reference diameter. Since the sleeve is ferromagnetic and extends symmetrically around and slightly below the lower portion of all sensing elements, it is in sweeping alignment with the end of the lower pole, whose sweeping flux is intercepted. At each aligned position of the lower pole with a sensing element, a similar and virtually equal fixed standard gap prevails between the lower pole of the magnet and the reference magnetic sleeve and since a portion of each sensing element intervenes, its negative voltage output amplitude will be representative of a fixed or standard gap length. As such, each negative emanating voltage pulse from a single element will represent a definite gap length measurement and can be used to correctly compensate and evaluate the corresponding pulse heights which represent radial measurements to the pipe and which are of quantitative interest.

From the above description it will be apparent that as the improved calipering tool moves through the tubing, a multiplicity of magnetic flux feelers probe the inside surface and that sensitive electronic gauging units respond instantly as the narrow beam of magnetic flux sweeps pits and irregularities in the wall surface. The signals from each feeler are amplified and recorded on separate channels of the magnetic tape recorder. Response of the instrument is not limited nor reduced by actuation of complicated mechanical feelers and their associated linkages for detecting and recording micro-movements in the feeler system. As distinguished from other systems heretofore employed, the present system, being entirely electromagnetic both in gauging and recording, has far greater response, whether the recording is done by components built into the instrument itself or is done at the surface by signals transmitted through a conductor cable.

While the foregoing has dealt particularly with a preferred embodiment as incorporated in an instrument to run through well tubing, it is to be understood that the improvement can be employed for yard testing of tubular goods or other bodies which themselves move relative to the testing instrument. Additionally, the instrument can be arranged to incorporate a rotating ring magnet to surround and caliper outside diameters of pipe upon relative movement between the pipe and the magnet, and various other modifications can be made as come within the scope of the appended claims.

What is claimed is:

1. In a magnetic tube caliper, a body for travel through the tube whose internal diameters are to be measured, a rotatable magnet mounted by the body on an axis extending in the direction of body travel to present the magnet poles in a circular path and in field gap relation with the tube internal wall surface, a circular succession of Hall-effect elements positioned by the body peripherally of the circular path of said magnetic poles so as to be within the field gap successively during magnet rotation, means supplying current to said elements and a magnetic tape recorder having a stack of recording heads responsive to voltage changes thereon and connected each to a different one of said Hall-effect elements.

2. A caliper for measuring tube diameters for a number of circumferential regions, comprising a support body, means to suspend the body for relative movement between the body and the tube in the longitudinal tube direction, a rotatable bar magnet mounted centrally of its ends by the body for rotation about a longitudinal axis with the oppositely projecting arms of the magnet terminating in north and south poles to travel in a circuit and in field gap relation with the tube wall, a circular succession of Hall-effect elements provided with current supply and voltage output connections and carried by the body in positions adjacent said circuit for inclusion successively within said field gap during magnet rotation and recording mechanism joined to said voltage output connections and responsive to voltage developed at the respective Hall-effect elements and influenced by gap reluctance in the region of each element for indicating gap dimension thereat.

3. In a magnetic tube caliper, a main body for travel through a tube of magnetic material, a rotatable magnet mounted by the body and terminated in diametrically opposite poles of given peripheral width, and for co-operation in field gap relation with a tube wall, an odd number of Hall-effect elements positioned by the body in surrounding radially spaced relation with the path of the magnet poles and in circular equally spaced apart succession, with the spacing between adjoining elements being greater than the pole peripheral width so that opposite poles concurrently are presented in radial alignment, one with an element and the other with a diametrically opposite space, current supply and Hall-effect voltage output connections with each element and recorder means joined to the output voltage connections of the elements and responsive to voltage output at each element for measuring gap reluctance to successively alternate positive flux and negative flux as the opposite poles traverse each element in sequence upon magnet rotation.

4. In a magnetic tube caliper, a mounting body to be received within a tube to be calipered, an even number of Hall-effect elements carried by and in like spaced apart relation throughout an annular zone of the body, a bar magnet rotatably mounted centrally of its length by the body with the oppositely projecting bar magnet arms terminating in north and south magnetic poles to travel in a circle inside said Hall-effect elements for radial alignment with the elements in succession and alignment simultaneously of north and south poles with diametrically opposite elements, means for passing electric current through the elements and means connected with each element and recording Hall-effect output voltage developed by magnetic force in the field as each pole travels through alignment with such element and as influenced by gap reluctance between the rotating poles and the wall of a tube in which the body has been received.

5. In a magnetic tube caliper, a mounting body, a rotatable magnet having opposite pole end faces axially offset from one another and adapted for presentation in field gap relation with a surface to be calipered, means on the body rotatably mounting the magnet for travel of said end faces in superposed circular paths, a succession of circularly spaced apart magnetic field sensing elements carried by the body in radially spaced and diametrically aligned relation with said circular paths and of such number and spacing that no sensing element is diametrically opposite another element and recording means responsive to the action of said elements individually for registering the influence on each element of positive flux and negative flux in alternate relation during magnet rotation.

6. In a caliper as in claim 5 together with a sleeve of magnetic material carried by the body to extend in diametrical alignment with one of said circular paths and within the field gap of the adjacent pole end face and ended outside the field gap of the other pole end face and short of its circular path.

7. In a caliper adapted for travel within a magnetic tube to be calipered, a housing having a nonmagnetic wall portion, a permanent bar magnet rotatably mounted by the housing and provided with axially offset opposite pole end faces inside said nonmagnetic wall portion for co-operation in field gap relation with the inner face of a tube to be measured, an odd number of field sensing elements carried by the housing in circularly spaced apart relation and in an annular zone surrounding the circular paths of the magnet end faces and means to register the magnetic field influence on each sensing element upon magnet rotation.

8. In a caliper having the elements of claim 7 and a band of magnetic material in surrounding relation to the circular path of only one of the magnet end faces.

9. In a magnetic caliper for measuring gap reluctance in a field extending to and from a circular wall surface of an annular body of magnetic material as an indication of surface irregularities, a tool adapted for co-operation with said body upon relative travel between the tool and the body in the axial direction of the annular body and comprised of a rotatable magnet having its opposite poles arranged to swing in a circular path in gap relation with the circular wall surface of the body during relative axial travel to present rotating magnetic flux across the field gaps at both poles, an annular succession of circularly spaced apart reluctance sensing elements immovably positioned on said tool in radial alignment and concentric spaced relation to said circular path of the rotatable magnet poles so as to be sequentially within said field gaps upon traverse thereof by the poles during magnet rotation and recorder mechanism connected with said elements and active to indicate reluctance of the gaps adjacent each pole as such gaps span each element in succession in pole traverse thereof.

References Cited in the file of this patent

UNITED STATES PATENTS

| 1,998,952 | Edgar et al. | Apr. 23, 1935 |
| 2,011,665 | Watts | Aug. 20, 1935 |
| 2,892,977 | Monaghan | June 30, 1959 |
| 2,897,438 | Fearon | July 28, 1959 |
| 2,924,633 | Sichling et al. | Feb. 9, 1960 |
| 2,963,644 | Nuttall | Dec. 6, 1960 |